United States Patent [19]

Lew

[11] Patent Number: 4,652,170

[45] Date of Patent: Mar. 24, 1987

[54] SLIDE CONNECTORS WITH FRICTIONAL LOCKING MEANS

[76] Inventor: Hyok S. Lew, 7890 Oak St., Arvada, Colo. 80005

[21] Appl. No.: 674,500

[22] Filed: Nov. 23, 1984

Related U.S. Application Data

[63] Continuation-in-part of Ser. No. 653,898, Sep. 24, 1984.

[51] Int. Cl.[4] ............................................. F16B 5/00
[52] U.S. Cl. ................................. 403/381; 403/331; 403/171; 403/217; 403/366; 52/282
[58] Field of Search .............. 403/331, 381, 257, 264, 403/236, 217, 218, 366, 171, 172, 174, 178, 345; 52/282, 585

[56] References Cited

U.S. PATENT DOCUMENTS

| | | | |
|---|---|---|---|
| 2,039,900 | 5/1936 | Hargrave | 403/257 |
| 3,186,561 | 6/1965 | Strassle | 403/345 X |
| 3,991,535 | 11/1976 | Keller et al. | 403/381 X |
| 4,042,307 | 8/1977 | Jarvis | 403/381 X |
| 4,125,338 | 11/1978 | Lew | 403/381 X |
| 4,280,769 | 7/1981 | Ceglowski | 403/218 |
| 4,490,064 | 12/1984 | Ducharme | 403/264 X |

FOREIGN PATENT DOCUMENTS

| | | | |
|---|---|---|---|
| 905078 | 7/1972 | Canada | 403/391 |
| 56960 | 8/1982 | European Pat. Off. | 403/331 |
| 629063 | 4/1936 | Fed. Rep. of Germany | 403/174 |
| 924046 | 1/1955 | Fed. Rep. of Germany | 403/381 |
| 770333 | 3/1957 | United Kingdom | 403/174 |
| 630485 | 10/1978 | U.S.S.R. | 403/174 |

Primary Examiner—Cornelius J. Husar
Assistant Examiner—Joseph A. Fischetti

[57] ABSTRACT

This invention relates to slide connectors which connect a plurality of boards in Ell, Tee, and Cross, connections. The connection is made by the retaining slide rails affixed to the edges of the boards that has a cross section having a narrowed-down root, each of which slidably engages one of four retaining slide grooves included in four sides of a connecting bar wherein the retaining slide groove has a cross section matched to the cross section of the retaining slide rail, which includes a narrowed-down opening. The connecting bar includes at least one hole of a finite depth having a noncircular cross section disposed at at least one extremity thereof, or a through hole of a noncircular cross section disposed therethrough in a coaxial relationship with respect to the geometric center line of the cross section of the connecting bar. A threaded cylindrical locking member having an outside diameter slightly greater than the inside diameter engages the noncircular hole included in the connecting bar nd creates a small amount of distortion on the cross sectional geometry of the connecting bar, which results in a frictional locking between the connecting bar and the retaining slide rails. When the threaded cylindrical locking member is removed, the cross sectional geometry of the connecting bar returns to the original shape and the slidable engagement between the connecting bar and the retaining slide rails is restored.

12 Claims, 22 Drawing Figures

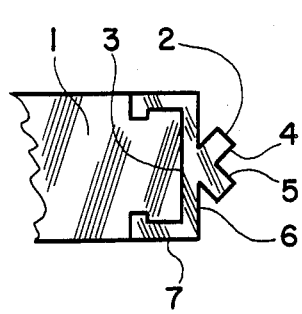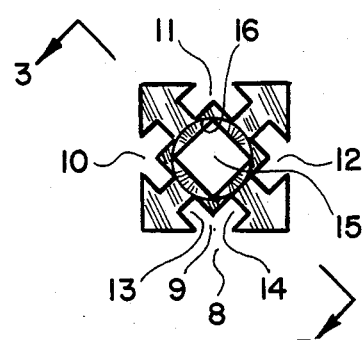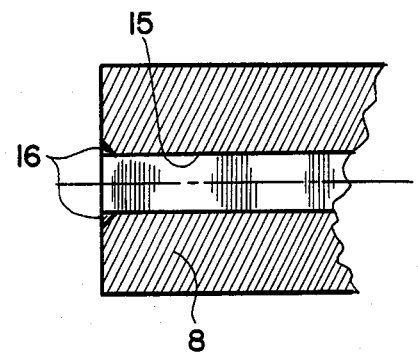
Fig. 1　　Fig. 2　　Fig. 3
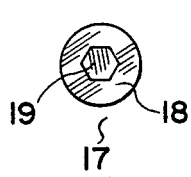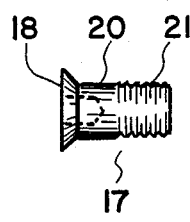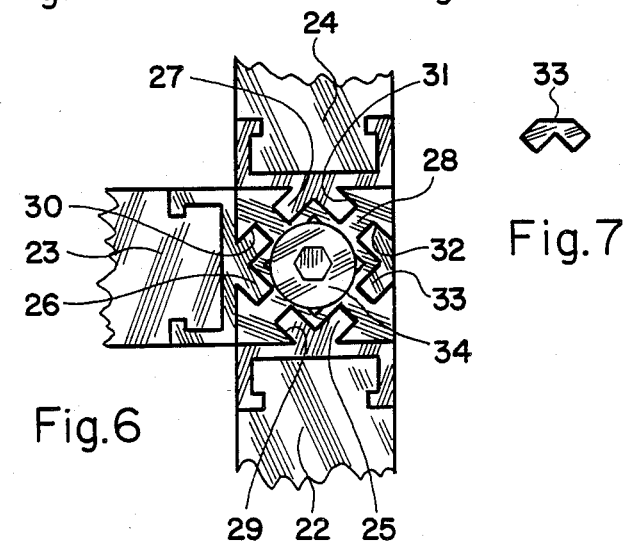
Fig. 4　　Fig. 5　　Fig. 6　　Fig. 7
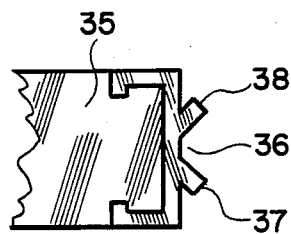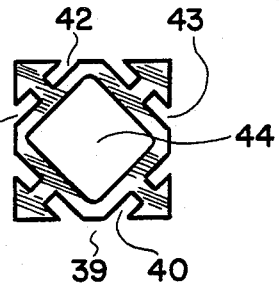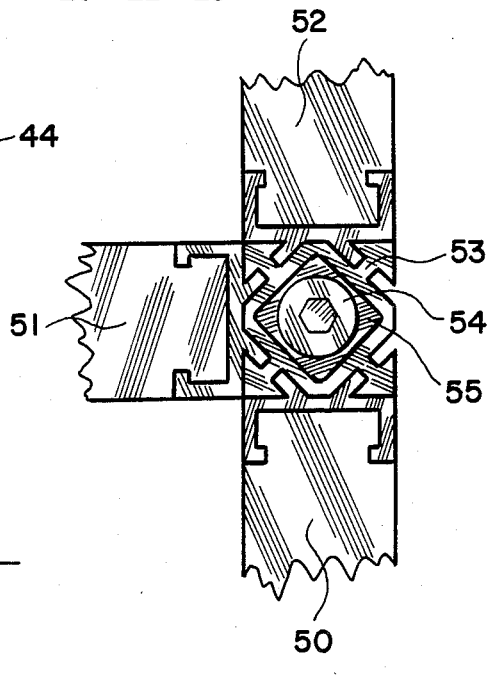
Fig. 8　　Fig. 9
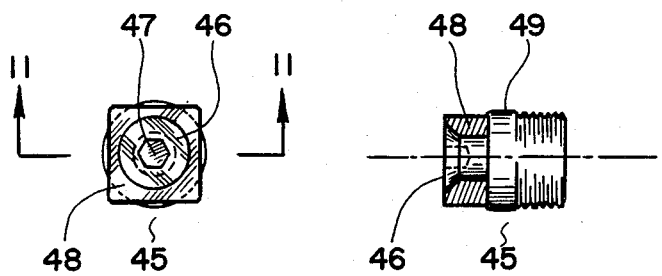
Fig. 10　　Fig. 11　　Fig. 12

SLIDE CONNECTORS WITH FRICTIONAL LOCKING MEANS

BACKGROUND OF THE INVENTION

This patent application is a Continuation-In-Part application to patent application Ser. No. 653,898 entitled "Skewed Double Groove Slide Joint" filed on Sept. 24, 1984.

In recent years, there has been a strong demand for office furniture and home furniture which can be assembled, disassembled and reassembled by the users. As a consequence, a new family of furniture known as "Knock-Down" or "K-D" system furniture has made a sizable inroad into today's furniture market. In order to compete with permanently assembled conventional furniture in the upper class furniture market, the "K-D" furniture must meet a few requirements: Firstly, they must comprise components of compact sizes and light weights: Secondly, these components must be assembled into an assembly having a high degree of rigidity and strength. Thirdly, the assembly must have an attractive appearance that displays the perfection and quality displayed by high quality conventional furniture. Fourthly, they must provide a flexibility in design and assembly whereby the users can build the custom designed furniture by using mass produced components. Without any exception, all "K-D" type furnitures available in the present day market fail to satisfy the aforementioned requirements. The key to the perfect "K-D" type furnitures is the perfect connecting system that enables the assembly of component boards into an assembly having a high degree of rigidity and strength, precise and accurate joints, and an extremely attractive appearance, wherein high quality is maintained after repeated assembly and disassembly of the furniture. The connecting system must have such a universality that the users are able to construct their custom-designed furniture by using mass-produced components, in which sense, the furniture system should be an "I Design and Assemble" or "IDA" system rather than a simple "Knock-Down" or "K-D" system.

The primary object of the present invention is to provide a connector system for "I Design and Assemble" or "IDA" furniture systems.

Another object is to provide a connector system for connecting a plurality of boards in Ell, Tee, and Cross connections with a high degree of dimensional precision and a high level of structural rgidity and strength.

A further object is to provide a connector system that is assembled and disassembled in a sliding relationship and locked by frictional means wherein repeated assembly and disassembly does not leave any marks on the connector system and does not alter the physical state thereof.

Yet another object is to provide a connector system that can be mass-produced by using todays metal-working or plastic-forming technology, i.e., extrusion method.

Yet a further object is to provide a connector system including a four sided connector bar including four retaining slide grooves respectively disposed in four sides; and plurality of retaining slide rails respectively affixed to the edges of a plurality of boards and a threaded cylindrical locking member interferingly engaging a noncircular hole disposed axially through the connector bar.

These and other objects of the present invention will become clear as the description thereof proceeds.

BRIEF DESCRIPTION OF FIGURES

The present invention may be described with a greater clarity and specificity by referring to the following figures:

FIG. 1 illustrates a front end view of a board including a retaining slide rail affixed to one extremity thereof.

FIG. 2 illustrates a front end view of a connector bar that connects the boards shown in FIG. 1 in ell, tee or cross connections.

FIG. 3 illustrates a cross section of the connector bar of FIG. 2 taken along a plane 3—3 as shown in FIG. 2.

FIG. 4 illustrates an end view of a countersunk head locking screw.

FIG. 5 illustrates a side view of the countersunk head locking screw shown in FIG. 4.

FIG. 6 illustrates a front end view of three boards connected in a tee-connection comprising the elements shown in FIGS. 1, 2 and 5.

FIG. 7 illustrates a cross section of a filler bar that slidably engages the unused retaining slide groove included in the connector bar of FIG. 2.

FIG. 8 illustrates a front ends view of another board including a retaining slide rail affixed to one extremity thereof.

FIG. 9 illustrates a front end view of a connector bar that connects the boards shown in FIG. 8 in ell, tee or cross connections.

FIG. 10 illustrates an end view of a locking member.

FIG. 11 illustrates a cross section of the locking member of FIG. 10 taken along a plane 11—11 as shown in FIG. 10.

FIG. 12 illustrates a front end view of three boards connected in a tee-connection comprising the elements shown in FIGS. 8, 9 and 11.

DESCRIPTION OF PREFERRED EMBODIMENTS

Figure 13:
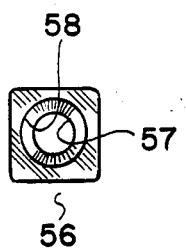
FIG. 13 illustrates an end view of another locking member usable in conjunction with the connector bar shown in FIG. 2 or 9.

In FIG. 1 there is illustrated a front end view of a board 1 including a retaining slide rail 2 affixed to one extremity 3 thereof. The retaining slide rail 2 comprises a pair of skewed rails 4 and 5 of substantially constant width and finite height which extend from the web 6 of a channel 7 in two diverging oblique directions, respectively. The flanges of the channel 7 include a pair of tongues disposed at the extremities thereof. The channel 7 is affixed to the extremity of the board by means of a tongue and groove joint wherein glueing or bonding may be further employed to strengthen the joint therebetween.

In FIG. 2 there is shown an end view of a connector bar 8 which is a four-sided elongated member. Four retaining slide grooves 9, 10, 11, and 12 having a cross section matched to the cross section of the retaining slide rail 2 shown in FIG. 1 are disposed in four sides of the connector bar 8, respectively. Each of the retaining slide grooves includes a pair of skewed grooves 13 and 14 of substantially constant width and finite depth which extend from the side surface of the connector bar 8 in two diverging oblique directions, respectively. The connector bar 8 includes a noncircular hole 15 of square cross section disposed in a substantially coaxial relationship with respect to the geometric center line of the cross section of the connector bar 8. The noncircular hole 15 is disposed in such a way that the core portion of the cross section of the connector bar 8 is substantially of a thin walled hollow square tubing. At least one extremity of the noncircular hole 15 includes a countersunk 16. It should be understood that the noncircular hole 15 may have a finite depth instead of being a through hole as shown in FIG. 2.

In FIG. 3 there is shown a cross section of the connector bar 8 taken along a plane 3—3 as shown in FIG. 2 wherein the noncircular hole 15 having at least one countersink 16 disposed at at least one extremity thereof is further illustrated.

In FIG. 4 there is shown an end view of a locking screw 17 having a flat countersunk head with a hex socket 19.

In FIG. 5 there is shown the full length of the the locking screw 17 including the flat countersunk head 18 and a shank 20 with threads 21 formed over a partial or total length of the shank 20. The shank diameter as well as the maximum diameter of the threaded portion thereof is slightly greater than the minimum inside dimension of the square cross section of the noncircular hole 15 included in the connector bar 8. When the locking screw 17 engages the noncircular hole 15 in a self-threading action, the interference between the outside diameter of the shank 20 of the locking screw 17 and the inside surface of the noncircular hole 15 deforms the flat sides of the noncircular hole 15 into a slightly oval shaped geometry that provides frictional locking between the retaining slide rail 2 and the retaining slide groove 9 which prevents the sliding movement therebetween. The deformation of the cross section of the connector bar 8 created by the locking screw takes place within the elastic limit of the material of the connector bar and, consequently, when the locking screw is removed from the noncircular hole 15, the sliding movement between the retaining slide rail 2 and the retaining slide groove 9 is restored. The countersink 16 included in the noncircular hole 15 of the connector bar 8 is matched to the countersunk head 18 of the locking screw 17 whereby the flat end of the countersunk head 18 of the locking screw 17 becomes flush with the end surface of the connector bar 8 when the locking screw 17 is fully threaded into the noncircular hole 15 of the connector bar.

In FIG. 6 there is shown a front end view of three boards 22, 23 and 24 respectively including retaining slide rails 25, 26 and 27 connected to each other in a tee-connection by means of the connector bar 28 including four retaining slide grooves 29, 30, 31 and 32. The unused groove 32 is filled up by a filler bar 33 slidably engaging the retaining slide groove 32. The locking screw 34 engaging and expanding the noncircular hole centrally disposed through the connector bar 28 frictionally locks the retaining slide rails 25, 26, and 27 in the retaining slide grooves 29, 30 and 31, respectively. Of course, the locking screw 34 also frictionally locks the filler bar 33 in the retaining slide groove 32. The flat countersunk head of the locking screw 34 is large enough to substantially fill up the noncircular hole included in the connector bar 28, which combination provides an attractive appearance for the tee-connection of the boards.

In FIG. 7 there is shown a cross section of the filler bar 33 that fills up the unused retaining slide groove included in the connector bar flush to its side surface. The filler bar 33 has a cross section same as the retaining slide rail 2 shown in FIG. 1 minus the base channel 7.

In FIG. 8 there is shown a front end view of a board 35 including a retaining slide rail 36 comprising a pair of skewed rails 37 and 38 having essentially the same construction as the pair of skewed rails 4 and 5 shown in FIG. 1 with one exception being that the skewed rails 37 and 38 have reparate roots while the skewed rails 4 and 5 have a common root.

In FIG. 9 there is shown a front end view of a connector bar 39 including four retaining slide grooves 40, 41, 42 and 43 disposed in four sides of the connector bar 39, respectively. Each of the retaining slide grooves 40, 41, 42 and 43 includes a pair of skewed grooves essentially the same as those included in the connector bar 8 shown in FIG. 2 with one exception being that the pair of skewed grooves included in the retaining slide grooves 40, 41, 42 and 43 have separate openings while the pair of skewed grooves included in the retaining slide grooves of the connector bar 8 have a common opening. The connector bar 39 includes a noncircular hole 44 coaxially disposed lengthwise through the connector bar 39. The square cross section of the noncircular hole 44 is disposed in such a way that the central portion of the cross section of the connector bar 39 is substantially of a thin walled square tubing.

In FIG. 10 there is illustrated an end view of a locking screw 45 including a flat countersunk head 46 with a hex socket 47 and a square washer 48.

In FIG. 11 there is illustrated a cross section of the locking screw 45 taken along a plane 11—11 as shown in FIG. 10. The locking screw 45 has an enlarged extremity 49 opposite to the flat countersunk head 46, which enlarged extremity 49 is partially or fully threaded. The outside diameter of the enlarged portion 49 of the shank of the locking screw 45 is slightly greater than the minimum inside dimension of the square cross section of the noncircular hole 44 of the connector bar 39 and, consequently, when the locking screw 45 threadedly engages the noncircular hole 44, the cross section of the connector bar 39 experiences a small amount of deformation which frictionally locks up the sliding movement between the retaining slide rail 36 and the retaining slide grooves 40, etc. The size of the square washer 48 retained in position intermediate the flat countersunk head 46 and the enlarged portion 49 of the locking screw 45 is made to fit into and fill up the noncircular hole 44 included in the connector bar 39. It should be mentioned that the locking screw 45 may be used in conjunction with the connector bar 8 shown in FIG. 2 minus the countersink 16.

In FIG. 12 there is illustrated a front end view of three boards 50, 51 and 52 including the retaining slide rails same as that shown in FIG. 8, which are connected to each other in a tee-connection by means of a connector bar 53 same as that shown in FIG. 9 wherein a locking screw 54 with a square washer 55 having the same construction as that shown in FIG. 11 frictionally locks up the boards 50, 51 and 52 to the connector bar 53.

In FIG. 13 there is illustrated an end view of a locking plug 56 having a square cross section at one extremity that includes a centrally disposed threaded hole 57 with a countersink 58.

Figure 14:
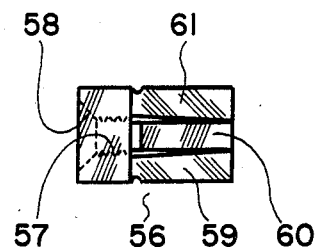
FIG. 14 illustrates a side view of the locking member shown in FIG. 13.

In FIG. 14 there is illustrated the full length of the locking plug 56 that includes the other extremity opposite to one extremity having a square cross section split into four prongs 59, 60, 61 and 62. The inside dimension between two diametrically opposite prongs is tapered down at the extremities of the prongs to a value slightly less than the maximum diameter of the threaded hole 57. When a flat countersunk head screw is threaded into the threaded hole 57, the advancing shank of the screw opens up the prongs 59, 60, 61 and 62 radially, and, consequently, they expand the noncircular hole of a square cross section included in a connector bar such as element 8 of FIG. 2 or element 39 of FIG. 9 resulting in a frictional locking between the retaining slide rails and the retaining slide grooves.

Figure 15:
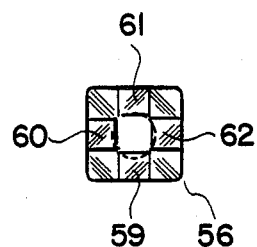
FIG. 15 illustrates the other end view opposite to one end view shown in FIG. 13 of the locking member.

In FIG. 15 there is illustrated the other end view of the locking plug 56 where at it is split into four prongs 59, 60, 61 and 62. The locking plug 56 may be used in conjunction with the connector bar 39 of FIG. 9 or the connector bar 8 of FIG. 2 minus the countersink 16. The locking screw 17 shown in FIG. 5 and the locking screw 45 shown in FIG. 11 is more preferable for the connector bars connecting reasonably thin boards, e.g., less than three quarters of an inch thick. The locking plug 56 of FIG. 14 is preferred for connector bars connecting thick boards.

Figure 16:
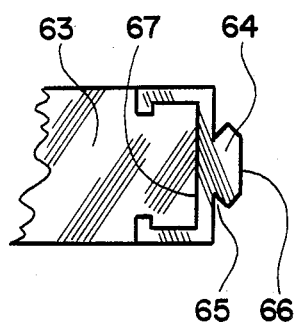
FIG. 16 illustrates a front end view of a further board including a retaining slide rail affixed to one extremity thereof.

In FIG. 16 there is shown a front end view of a board 63 including a retaining slide rail 64 having a narrowed-down root 65 and a substantially flat ridge 66 affixed to one extremity 67 of the board 63.

Figure 17:
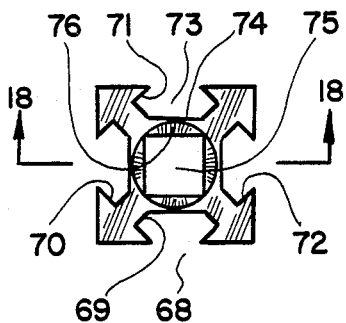
FIG. 17 illustrates a front end view of a connector bar that connects the boards shown in FIG. 17 in ell, tee, and cross connections.

In FIG. 17 there is illustrated a front end view of a connector bar 68 including four retaining slide grooves 69, 70, 71 and 72 disposed in four sides of the connector bar 68, respectively. Each of the retaining slide grooves has a cross section including a narrowed-down opening 73 and a substantially flat bottom 74, that is matched to the cross section of the retaining slide rail 64 shown in FIG. 16. A noncircular hole 75 with a square cross section is disposed coaxially through the length of the connector bar 68 wherein at least one extremity of the noncircular hole 75 includes a countersink 76. The noncircular hole is disposed in such a way that the central portion of the cross section of the connector bar 68 is substantially of a thin walled hollow square tubing.

Figure 18:
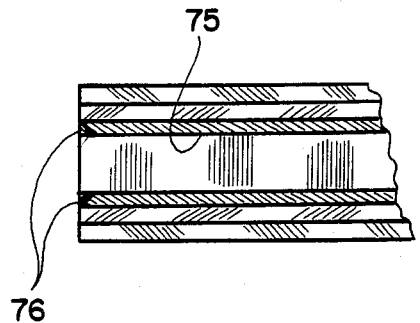
FIG. 18 illustrates a cross section of the connector bar of FIG. 17 taken along a plane 18—18 as shown in FIG. 17.

In FIG. 18 there is illustrated a cross section of the connector bar 68 taken along a plane 18—18 as shown in FIG. 17, wherein the noncircular hole 75 with a countersink 76 is further illustrated.

Figure 19:
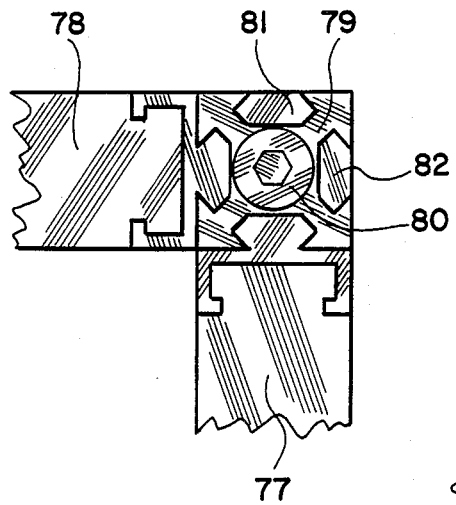
FIG. 19 illustrates a front end view of two boards connected in an ell-connection comprising the elements shown in FIGS. 16, 17 and 5.

In FIG. 19 there is illustrated a front end view of two boards 77 and 78 including retaining slide rails the same as that shown in FIG. 16, which are connected to one another in an ell-connection by a connector bar 79 having the same construction as that shown in FIG. 17. A locking screw 80 the same as that shown in FIG. 5 threadedly engages the noncircular hole included in the connector bar 79 and frictionally locks up the sliding movement between the retaining slide rails and the retaining slide grooves. The unused retaining slide grooves are filled up by the filler bars 81 and 82 slidably engaging the unused retaining slide grooves and frictionally locked in position by the deformation created by the locking screw 80.

Figure 20:
FIG. 20 illustrates a cross section of a filler bar that slidably engages the unused retaining slide grooves included in the connector bar of FIG. 17.

In FIG. 20 there is illustrated a cross section of a filler bar 81 that fills up an unused retaining slide groove flush to the side of the connector bar. The filler bar 81 has the same cross section as the retaining slide rail 64 shown in FIG. 16 minus the base channel.

Figure 21:
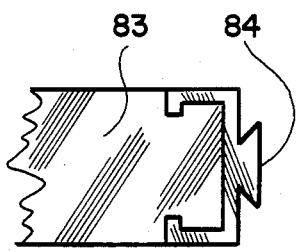
FIG. 21 illustrates a front end view of a another board including a retaining slide rail affixed to one extremity thereof.

In FIG. 21 there is illustrated a front end view of a board 83 including a dove-tail shaped retaining slide rail 84 affixed to one extremity thereof.

Figure 22:
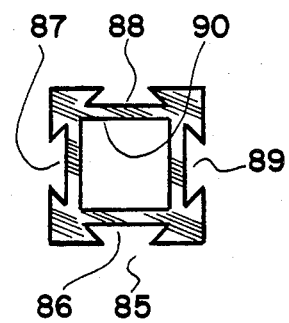
FIG. 22 illustrates a front end view of a connector bar that connects the boards shown in FIG. 21 in ell, tee, or cross connections.

In FIG. 22 there is illustrated an end view of a connector bar 85 including four dove tail shaped retaining slide grooves 86, 87, 88 and 89 disposed in four sides of the connector bar 85, respectively. The cross section of the dove-tail shaped retaining slide groove is matched to the dove-tail shaped retaining slide rail 84 shown in FIG. 21. The connector bar 85 includes a noncircular hole 90 with a square cross section coaxially disposed through the length of the connector bar 85 wherein it is disposed in such a way that the central portion of the cross section of the connector bar 85 resembles a thin walled hollow square tubing. The noncircular hole 90 of the connector bar 85 may be engaged by the locking screw 45 shown in FIG. 11 or the locking plug 56 shown in FIG. 14 that frictionally locks up the sliding movement between the retaining slide rails and the retaining slide grooves by causing a small deformation of the cross section of the connector bar. It should be understood that the noncircular hole included in the connector bars such as that shown in FIGS. 22, 17, 9 or 8 may be of a finite depth instead of a through hole. It is not difficult to imagine that there will be many variations in the combination comprising the cross sectional geometry of the retaining slide grooves and that of the noncircular hole included in a connector bar that provides a frictional locking by means of a small deformation in the cross sectional dimensions of the connector bar created by a locking screw or locking plug forcibly engaging the noncircular hole included in the connector bar, which combinations differ in dimensions and geometry from the illustrative embodiments shown herein and, yet, rely on the same principle as those of the present invention.

While the principles of the present invention have now been made clear by the illustrative embodiments, it will be immediately obvious to those skilled in the art many modifications of the arrangements, elements, proportion, structures and materials, which are particularly adapted to the specific working environment and operating condition in the practice of the invention without departing from those principles.

I claim:

1. An universal slide connector with frictional locking means comprising in combination:
   (a) a slide connector bar having a substantially square cross section including four sets of retaining slide grooves respectively disposed on four sides of said slide connector bar in lengthwise direction, each of said four sets of retaining slide grooves having a cross section comprising a converging opening open to one side of said slide connector bar and a diverging extremity disposed adjacent to the geometrical center of the cross section of said slide connector bar; and at least one noncircular hole having a noncircular cross section disposed through the geometrical center of the cross section of said slide connector bar at at least one extremity of said slide connector bar wherein said diverging extremities of said retaining slide grooves and said noncircular hole are separated from each other by a thin section of material constituting said slide connector bar;
   (b) a plurality of sets of retaining slide rails respectively affixed to the extremities of a plurality of boards in a parallel relationship with respect to edges of said extremities of said boards each of said plurality of sets of retaining slide rails having a cross section with a converging root and diverging extremities having a corresponding cross-section to the cross-section of said sets of retaining slide grooves; and
   (c) a locking means engaging said at least one noncircular hole disposed at at least one extremity of said slide connector bar in an interfering relationship therebetween and deflecting said thin section of material intermediate said diverging extremities of said retaining slide grooves and said noncircular hole;
   wherein said plurality of retaining slide rails respectively affixed to the extremities of said plurality of boards slidably engaging at least two of said four sets of said retaining slide grooves in said slide connector bar and frictionally locked to each other by said locking means deflecting said thin section of material adjacent to said retaining slide grooves against said diverging extremities of said retaining slide rails provide an ell, tee or cross-connection of said plurality of boards.

2. The combination as set forth in claim 1 wherein said at least one noncircular hole includes a circular countersink disposed coaxially to said noncircular hole at an extremity of said slide connector bar, and said locking means comprises a countersunk head screw with the maximum thread diameter slightly greater than the minimum diagonal internal dimensions of said noncircular hole.

3. The combination as set forth in claim 1 wherein said locking means comprises an expandable plug having a cross section at one extremity substantially matched to the cross section of said noncircular hole.

4. An universal slide connector with frictional locking means comprising in combination:
   (a) a slide connector bar having a substantially square cross section including four sets of retaining slide grooves respectively disposed on four sides of said slide connector bar in lengthwise direction, each of said four sets of retaining slide grooves comprising in combination a pair of elongated grooves disposed in a skewed relationship to one another on a side of said slide connector bar in a lengthwise direction wherein the cross section of the combination of said pair of elongated grooves includes a pair of cut-outs of substantially constant width and finite depth extending from said side of said slide connector bar in a diverging configuration and at least one noncircular hole having a noncircular cross section disposed through the geometrical center of the cross section of said slide connector bar at at least one extremity of said slide connector bar wherein each of said retaining slide grooves and said noncircular hole are separated from each other by a thin section of material constituting said slide connector bar;
   (b) a plurality of sets of retaining slide rails respectively affixed to the extremities of a plurality of boards in a parallel relationship with respect to edges of said extremities of said boards, each of said plurality of sets of retaining slide rails comprising in combination a pair of elongated rails disposed in a skewed relationship to one another and extending from the extremities of said boards wherein the cross section of said pair of elongated rails includes a pair of extensions of substantially constant width and finite height extending from said extremities of said boards in a diverging configuration corresponding to the cross section of said sets of retaining slide grooves; and
   (c) a locking means engaging said at least one noncircular hole disposed at at least one extremity of said slide connector bar in an interfering relationship therebetween and deflecting said thin section of material intermediate said retaining slide grooves and said noncircular hole;
   wherein said plurality of retaining slide rails respectively affixed to the extremities of said plurality of boards slidably engaging at least two of said four sets of said retaining slide grooves included in said slide connector bar and frictionally locked to each other by said locking means deflecting said thin section of material adjacent to said retaining slide grooves against said ridges of said retaining slide rails provide an ell, tee or cross connection of said plurality of boards.

5. The combination as set forth in claim 4 wherein said at least one noncircular hole includes a circular countersink disposed coaxially to said noncircular hole at an extremity of said slide connector bar, and said locking means comprises a countersunk head screw with the maximum thread diameter slightly greater than the minimum diagonal dimensions of said noncircular hole.

6. The combination as set forth in claim 4 wherein said locking means comprises an expandable plug having a cross section at one extremity substantially matched to the cross section of said noncircular hole.

7. An universal slide connector with frictional locking means comprising in combination:
   (a) a slide connector bar having a substantially square cross section including four sets of retaining slide grooves respectively disposed on four sides of said slide connector bar in lengthwise direction, each of said four sets of retaining slide grooves having a cross section comprising a narrowed-down opening open to one side of said slide connector bar and a substantially convex bottom disposed adjacent to the geometrical center of the cross section of said slide connector bar; and at least one noncircular hole having a noncircular cross section disposed through the geometrical center of the cross section of said slide connector bar at at least one extremity of said slide connector bar wherein said substantially convex bottoms of said retaining slide grooves and said noncircular hole are separated from each other by a thin section of material constituting said slide connector bar;

(b) a plurality of sets of retaining slide rails respectively affixed to the extremities of a plurality of boards in a parallel relatonship with respect to edges of said extremities of said boards each of said plurality of the sets of retaining slide rails having a cross section with a narrowed-down root and a substantially corresponding concave ridge to the cross section of said sets of retaining slide grooves, and (c) a locking means engaging said at least one noncircular hole disposed at at least one extremity of said slide connector bar in an interfering relationship therebetween and deflecting said thin section of material intermediate said convex bottoms of said retaining slide grooves and said noncircular hole; wherein said plurality of retaining slide rails respectively affixed to the extremities of said plurality of boards slidably engaging at least two of said four sets of said retaining slide grooves included in said slide connector bar and frictionally locked to each other by said locking means deflecting said substantially convex bottoms of said retaining slide grooves against said substantially concave ridges of said retaining slide rails provide an ell, tee or cross-connection of said plurality of boards.

8. The combination as set forth in claim 7 wherein said at least one noncircular hole includes a circular countersink disposed coaxially to said noncircular hole at an extremity of said slide connector bar, and said locking means comprises a countersunk head screw with the maximum thread diameter slightly greater than the minimum diagonal dimensions of said noncircular hole.

9. The combination as set forth in claim 7 wherein said locking means comprises an expandable plug having a cross section at one extremity substantially matched to the cross section of said noncircular hole.

10. An universal slide connector with frictional locking means comprising in combination:

(a) a slide connector bar having a substantially square cross section including four sets of retaining slide grooves respectively disposed on four sides of said slide connector bar in lengthwise direction, each of said four sets of retaining slide grooves having a cross section comprising a narrowed-down opening open to one side of said slide connector bar and a substantially flat bottom disposed adjacent to the geometrical center of the cross section of said slide connector bar; and at least one noncircular hole having a noncircular cross section disposed through the geometrical center of the cross section of said slide connector bar at at least one extremity of said slide connector bar wherein said substantially flat bottoms of said retaining slide grooves and said noncircular hole are separated from each other by a thin section of material constituting said slide connector;

(b) a plurality of retaining slide rails respectively affixed to the extremities of a plurality of boards in a parallel relationship, each of said plurality of the retaining slide rails having a cross section with a narrowed-down root and a substantially flat ridge corresponding to the cross section of said retaining slide groove; and (c) a locking means engaging said at least one noncircular hole disposed at at least one extremity of said slide connector bar in an interfering relationship therebetween and deflecting said thin section of material intermediate said substantially flat bottoms of said retaining slide grooves and said noncircular hole;

wherein said plurality of retaining slide rails respectively affixed to the extremities of said plurality of boards slidably engaging at least two of said four sets of said retaining slide grooves included in said slide connector bar and frictionally locked to each other by said locking means deflecting said substantially flat bottoms of said retaining slide grooves against said substantially flat ridges of said retaining slide rails provide an ell, tee or cross-connection of said plurality of boards.

11. The combination as set forth in claim 10 wherein said at least one noncircular hole includes a circular countersink disposed coaxially to said noncircular hole at an extremity of said slide connector bar, and said locking means comprises a countersunk head screw with the maximum thread diameter slightly greater than the minimum diagonal dimensions of said noncircular hole.

12. The combination as set forth in claim 10 wherein said locking means comprises an expandable plug having a cross section at one extremity substantially matched to the cross section of said noncircular hole.

* * * * *